United States Patent [19]
Gilmore

[11] Patent Number: 5,423,413
[45] Date of Patent: Jun. 13, 1995

[54] ELECTRICAL CABLE SUPPORT IN EXTENDABLE CONVEYOR

[75] Inventor: Phillip J. Gilmore, Healdsburg, Calif.

[73] Assignee: Rapistan Demag Corporation, Grand Rapids, Mich.

[21] Appl. No.: 131,198

[22] Filed: Oct. 1, 1993

[51] Int. Cl.[6] .......................................... B65G 15/26
[52] U.S. Cl. ............................ 198/594; 198/812; 414/398
[58] Field of Search ............... 198/594, 812, 595, 588, 198/861.1; 414/390, 391, 392, 393, 398

[56] References Cited

U.S. PATENT DOCUMENTS

| | | | |
|---|---|---|---|
| 1,041,439 | 10/1912 | Dearborn | 198/812 |
| 1,249,239 | 12/1917 | Suffolk . | |
| 1,343,799 | 6/1920 | Trefren | 198/812 |
| 2,166,447 | 7/1939 | Ruppenthal | 198/812 |
| 2,815,849 | 12/1957 | Zumbrunnen | 198/812 |
| 3,127,978 | 4/1964 | Zuercher | 198/812 |
| 3,228,516 | 1/1966 | Sheehan | 198/313 X |
| 3,305,220 | 2/1967 | Nevulis . | |
| 3,402,805 | 9/1968 | Spellman, Jr. | 198/313 |
| 3,613,866 | 10/1971 | Arndt | 198/812 |
| 3,826,353 | 7/1974 | Greasley | 198/812 |
| 3,835,980 | 9/1974 | Brooks, Jr. | 198/812 |
| 3,945,484 | 3/1976 | Oury | 198/313 |
| 4,312,540 | 1/1982 | Thompson | 198/313 X |
| 4,392,573 | 7/1983 | Gyomrey . | |
| 4,406,375 | 9/1983 | Hockensmith . | |
| 4,425,069 | 1/1984 | Saur et al. | 198/311 X |
| 4,474,287 | 10/1984 | Thompson | 198/812 |
| 4,643,299 | 2/1987 | Calundan | 198/812 |
| 4,813,526 | 3/1989 | Bélanger | 198/588 |
| 4,860,878 | 8/1989 | Mraz et al. | 198/812 X |
| 4,946,027 | 8/1990 | Jenkins | 198/592 |
| 5,009,560 | 4/1991 | Ruder et al. . | |
| 5,046,603 | 9/1991 | Odenthal | 198/812 |
| 5,067,867 | 11/1991 | Ruder et al. | 198/592 X |
| 5,193,660 | 3/1993 | McKernan et al. | 198/812 X |
| 5,203,442 | 4/1993 | Oury et al. | 198/313 |
| 5,307,917 | 5/1994 | Hall | 198/313 |
| 5,351,809 | 10/1994 | Gilmore et al. | 198/812 |

Primary Examiner—Cheryl L. Gastineau
Attorney, Agent, or Firm—Price, Heneveld, Cooper, Dewitt & Litton

[57] ABSTRACT

An extendable conveyor unit supports the extendable units directly from the warehouse floor with a minimum amount of support structure. The extendable conveyor includes one or more extendable units, a stationary support for supporting the extendable units, and a conveying surface defined on an extended portion of the extendable units. The stationary support supports the extendable units between a fully extended position, wherein the extendable units extend from the support in the direction of the vehicle to be loaded and a fully retracted position in which the extendable units extend from the support in a direction opposite from the direction of the vehicle to be loaded. The conveying surface may be a gravity roller conveyor or it may be an endless belt. When the conveying surface is an endless belt, an elevating unit may be provided with the stationary support in order to elevate the conveying member above the extendable unit at the stationary support to match up with a discharge or receiving conveyor. A cable routing system to the extendable units includes an electrical cable running between the stationary support and an extendable unit over a sheave mounted to another extendable unit with the extendable units extended at a rate that maintains tension on the cable for all extendable positions of the extendable units.

21 Claims, 8 Drawing Sheets

ELECTRICAL CABLE SUPPORT IN EXTENDABLE CONVEYOR

BACKGROUND OF THE INVENTION

This invention relates generally to conveyors and, more particularly, to extendable conveyors for loading product to, or unloading product from, a truck trailer or the like.

Retractable conveyors are permanently mounted to a warehouse dock area in the vicinity of a loading door and are incrementally extendable into the cargo area of a trailer truck. Such extendable conveyors have been provided for loading product onto the truck, in which case the conveyor may be a gravity fed roller conveyor or a driven endless belt conveyor. Such extendable conveyors have also been provided for unloading product from the trailer, in which case the conveying surface is a driven endless belt.

The prior art extendable conveyors include a base unit that is anchored to the warehouse floor and two or more extendable units which nest in the base unit when the extendable units are in a fully retracted position. The base unit typically includes horizontal support channels in order to guide the extendable units in extending and retracting movements and to bear the cantilever load of the extendable units, as well as sheet metal members in order to enclose the base unit.

Extendable conveyors in the past have utilized cable reels in order to pay out control and power electrical cables to the extendable end of the conveyor and to reel in the slack in the cables as the conveyor is retracted. Such take-up reels have been a source of equipment failure and complexity resulting from intermittent electrical connections in the commutator set.

SUMMARY OF THE INVENTION

The present invention is intended to provide an extendable conveyor that does away with the necessity of a base unit and supports the extendable units directly from the warehouse floor with a minimum amount of support structure. An extendable conveyor according to the invention for conveying product between a particular location and a selectable variable location includes one or more extendable units, a stationary support for supporting the extendable units and a conveying surface defined on an extended portion of the extendable units. The stationary support supports the extendable units between a fully extended position wherein the extendable units extend from the support in the direction of the truck to be loaded and a fully retracted position in which the extendable units extend from the support in a direction opposite from the direction of the vehicle to be loaded. In this manner, the requirement for a base unit into which the extendable units are nested in a fully retracted position is eliminated. Furthermore, the necessity for elongated horizontal support channels, that are approximately the length of the extendable unit, is eliminated.

The extendable units may be made longer without adding commensurately to the cost of the overall unit because there is no base unit that must be made as long as the extendable units. By allowing the extendable units to be made longer, the interior portions of a truck trailer may be easily reached while allowing the support to be set back from the edge of the loading dock. This allows the provision of an aisle-way between the support and the warehouse wall to allow loading vehicles to traverse the line of the extendable conveyors.

The conveying surface may be a gravity roller conveyor, in which case the extendable conveyor is a trailer loader. The conveying surface may alternatively be an endless belt, in which case the extendable unit may be made as either a trailer loader or an unloader. When the conveying surface is an endless belt, an elevating unit may be provided with the stationary support in order to elevate the conveying member above the extendable unit at the stationary support. This allows the conveying member to match up with a discharge or receiving conveyor.

According to another aspect of the invention, an extendable conveyor having at least first and second extendable units, a support to extendably support the first extendable unit from a stationary surface, means for extendably supporting the second extendable unit from the first extendable unit and extension drive means for extending the first extendable unit from the support and the second extendable unit from the first extendable unit are provided with a unique system for routing electrical power and control cables to the remote end of the second extendable unit. The cable routing system includes a first electrical terminal on the stationary surface and a second electrical terminal on the remote end of the second extendable unit with an electrical cable between the first and second electrical terminals. The control cable extends over a sheave that is attached to the end of the first extendable unit opposite the remote end of the second extendable unit. The extension drive means extends the second extendable unit at a rate that is twice the rate that it extends the first extendable unit. In this manner, the electrical cable is tensioned for all extendable positions of the extendable units without the requirement of an unreliable take-up reel. This unique cable routing system may be applied, according to a further aspect of the invention, to extendable conveyors having any multiple of two extendable units.

These and other objects, advantages and features of this invention will become apparent upon review of the following specification in conjunction with the drawings.

DESCRIPTION OF THE PREFERRED EMBODIMENT

Referring now specifically to the drawings, and the illustrative embodiments depicted therein, an extendable conveyor 15 is provided to load packages from a feeder conveyor 17 to a trailer 19 (FIGS. 1–5). Extendable conveyor 15 includes a first extendable unit 20, which is extendably supported from a horizontal surface, such as a floor 22, by a stationary support, generally indicated at 24. Extendable conveyor 15 further includes a second extendable unit 26, which is extendably supported from first extendable unit 20. A conveying surface generally indicated at 28 is formed on the extended portions of extendable units 20, 26 by a plurality of parallel, freely rotatable rollers 30 on first extendable unit 20 and a plurality of parallel, freely rotatable rollers 32 on extendable unit 26. As may best be seen in FIGS. 2 and 3, rollers 30 are elevated above second extendable unit 26 in order to provide a slope to conveying surface 28 in the direction of trailer 19 in order to gravity feed product from feeder conveyor 17 to the trailer.

Figure 1:
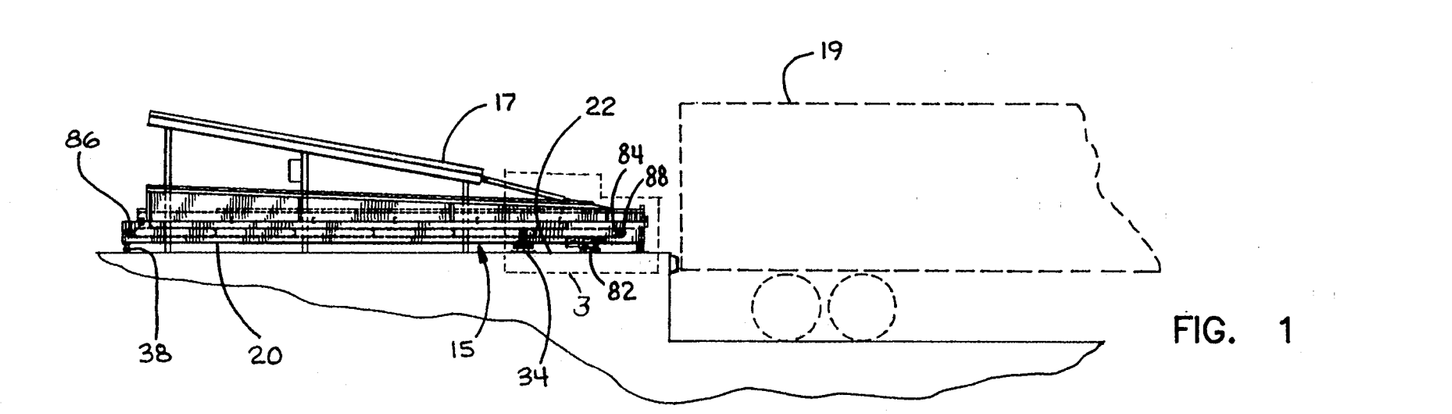
FIG. 1 is a side elevation of a first embodiment of the invention in a fully retracted position.
Figure 2:
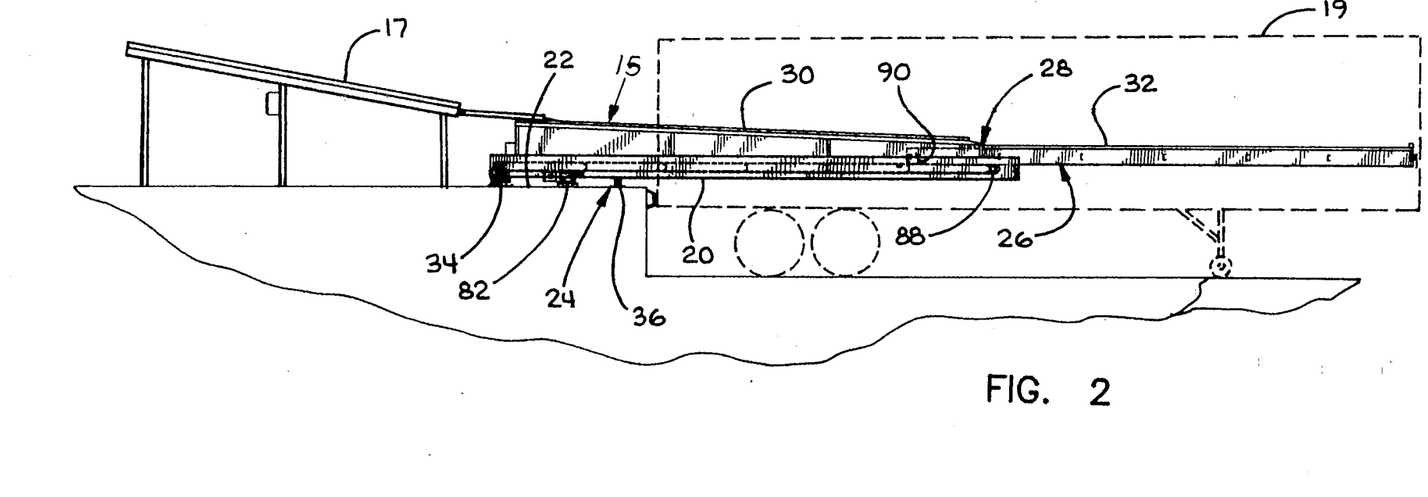
FIG. 2 is a side elevation of the extendable conveyor in FIG. 1 in a fully extended position.
Figure 3:
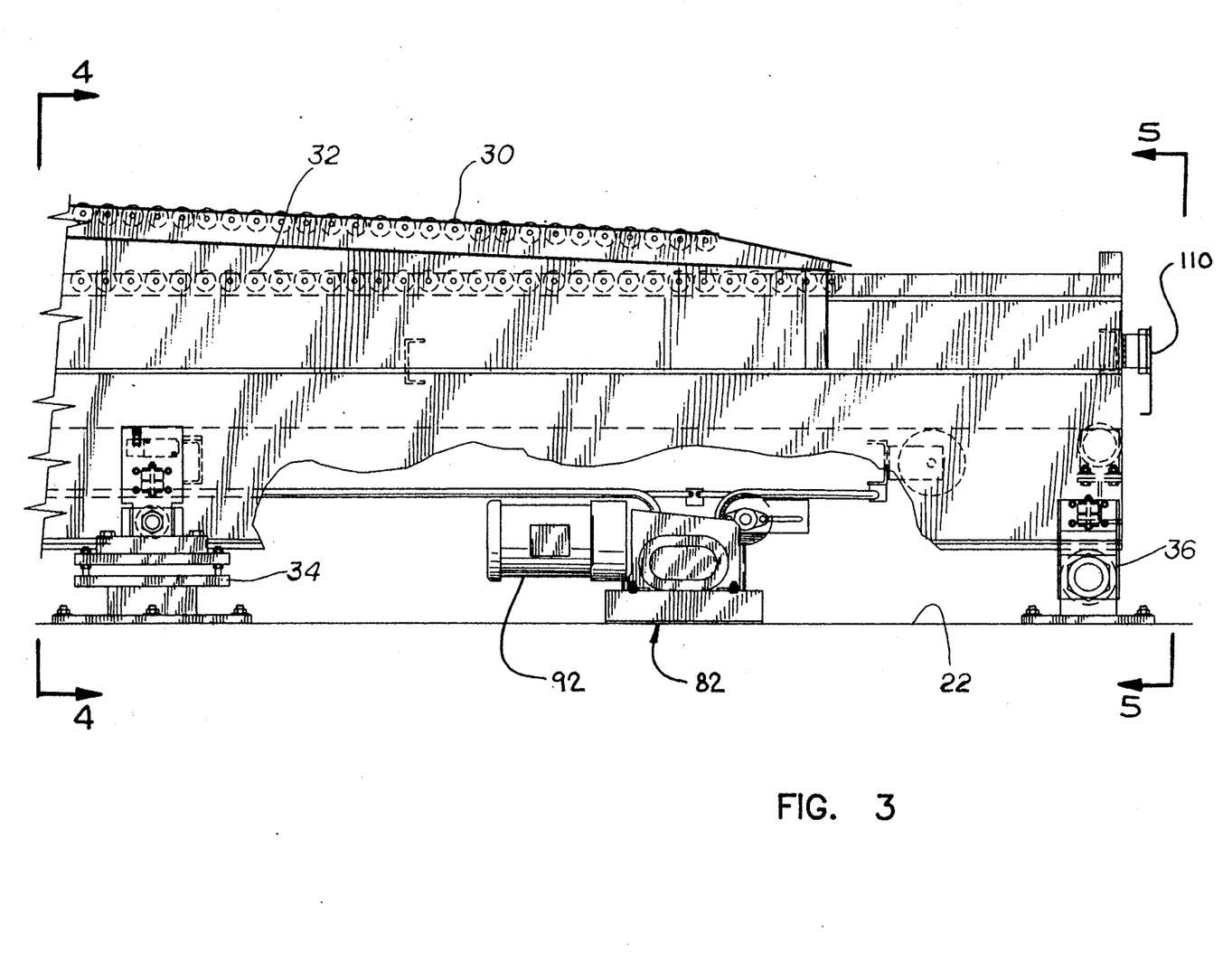
FIG. 3 is an enlarged view of the area designated 3 in FIG. 1.

Stationary support 24 includes a pair of rear vertical support members 34a and 34b and a pair of forward vertical support members 36a and 36b, all of which are configured to be rigidly attached to horizontal surface 22. As may be seen by comparing FIGS. 1 and 2, extendable units 20 and 26 incrementally extend between a fully retracted position, wherein the extendable units are both to the left of support 24, as illustrated in FIG. 1, and a fully extended position, as illustrated in FIG. 2, wherein the extendable units are both to the right of support 24. In the fully extended position illustrated in FIG. 2, stationary support 24 bears the cantilever load of the extendable units and any product being conveyed thereon. When in the fully retracted position illustrated in FIG. 1, a pair of casters 38 positioned at the inward end of first extendable unit 20 supports the inward ends of the extendable unit. In this manner, rear vertical supports 34a and 34b are required to bear only upward vertical forces and forward vertical supports 36a and 36b are required to bear only downward vertical forces. Casters 38 alleviates the necessity of rear vertical support 34 supporting downward forces or forward vertical support 36 bearing upward forces. First extendable unit 20 includes a pair of parallel spaced apart I-beams 40 and 42 joined by lateral braces 44 (FIG. 4), which are all structural steel members. Rear vertical supports 34a and 34b each include a pair of cam followers 46a, 46b, respectively, which bear against a web 48 of the respective I-beams 40, 42. Cam followers 46a and 46b are supported by pedestals 50a and 50b, which are bolted to horizontal support 22 by bolts 52. A pair of vertical axis cam followers 54a and 54b provide lateral alignment to the first extendable unit 20.

Figure 4:
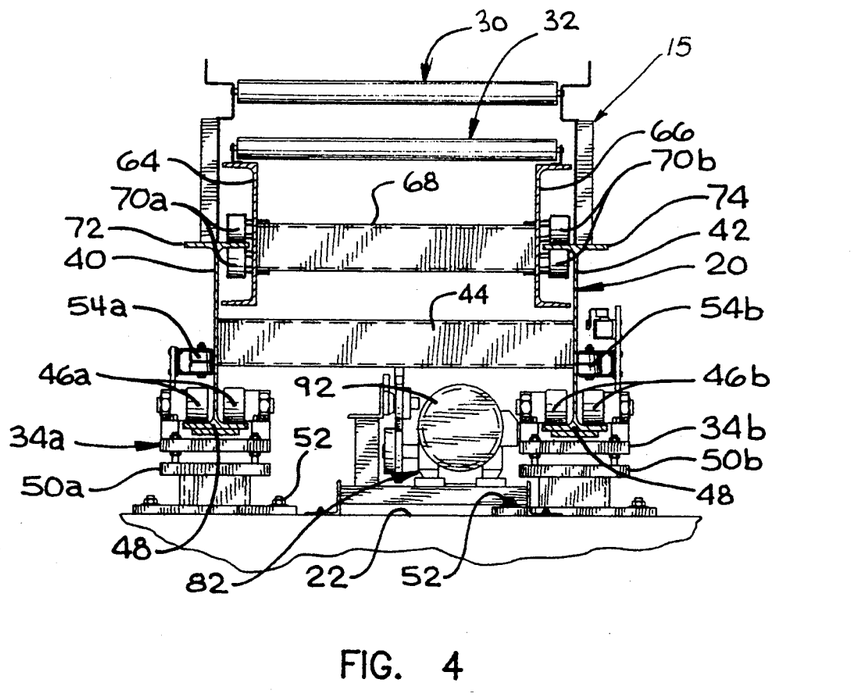
FIG. 4 is a view generally from the direction 4—4 in FIG. 3.
Figure 5:
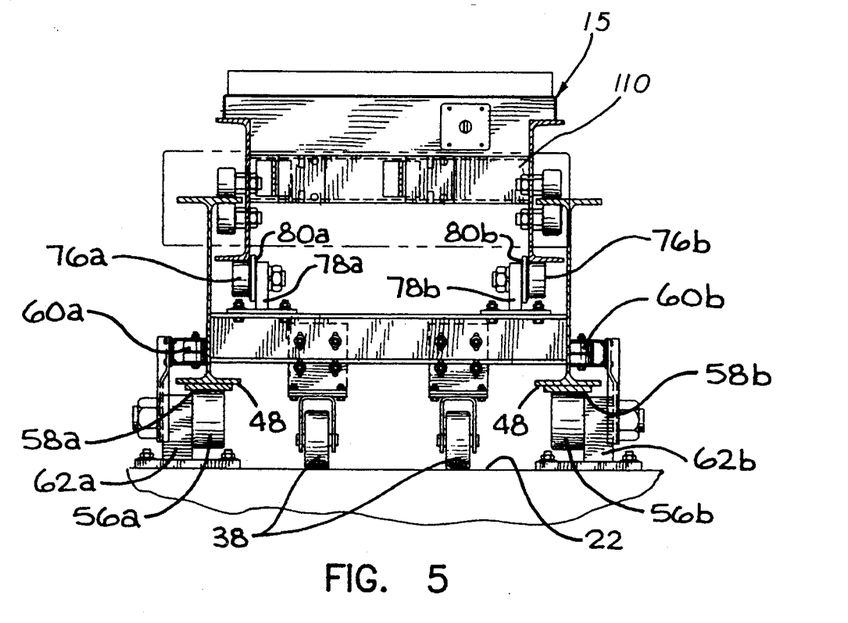
FIG. 5 is a view generally in the direction 5—5 in FIG. 3.
Figure 6:
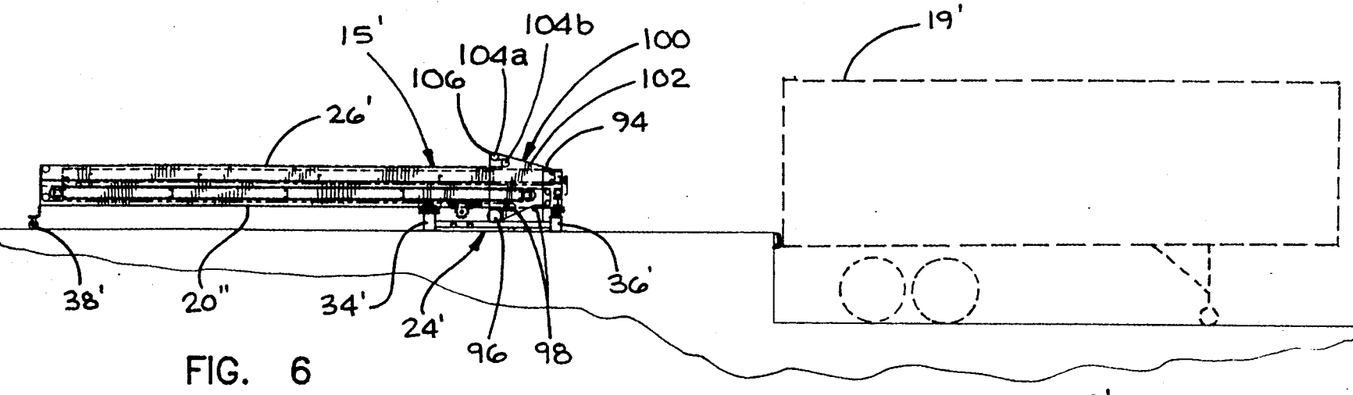
FIG. 6 is a side elevation of a second embodiment of an extendable conveyor according to the invention.

Forward vertical supports 36a and 36b each include a pair of cam followers 56a and 56b positioned under webs 48. Wear strips 58a, 58b positioned between the cam followers and the web ensure a smooth operating surface for the cam followers. A pair of vertical axis cam followers 60a, 60b provide lateral alignment to the forward portion of first extendable unit 20. Pedestals 62a and 62b rotatably mount cain followers 56a, 56b, 60a and 60b to horizontal surface 22.

Second extendable unit 26 includes a pair of side members 64 and 66 which, in the illustrated embodiment, are C-channel structural steel and are interconnected by lateral braces 68. The rearward portion of second extendable unit 26 is supported by cain followers 70a that interact with opposite surfaces of upper web 72 of beam 40, and 70b which interact with upper web 74 of beam 42. The forward extended portion of second extendable unit 26 is supported by a pair of cam followers 76a, 76b, which are rotatably mounted by brackets 78a and 78b. A lateral alignment flange 80a, of cam follower 76a, and 80b, of cam follower 76b, provide lateral alignment to the nose to second extendable unit 26.

An extension drive unit 82, which is mounted to horizontal surface 22, extends the first extendable unit 20 with respect to support 24 and the second extendable unit with respect to the first extendable unit at a predefined proportional rate. Unit 82 drives an elongated chain 84 that is affixed at opposite ends to the first extendable unit around sprockets 86 and 88. Chain 88 is attached to second extendable unit 26 at 90. In this manner, as extension unit 82 drives chain 84, which is guided around sprockets 86 and 88, first extendable unit 20 is extended outwardly at a predetermined rate and second extendable unit 26 is extended at a rate that is double the rate of the payout of the first extendable unit with respect to a stationary point. In the illustrated embodiment, extension unit 82 is motor operated by an electric motor 92. However, it could, alternatively, be manually operated.

Extendable conveyor 15 is capable of loading product to trailer 19. In order to unload product from trailer 19, an extendable conveyor 15' is provided (FIGS. 6–9). Extendable conveyor 15' includes a first extendable unit 20' that is supported by a stationary support 24' and a second extendable unit 26' that is supported by first extendable unit 20'. In this manner, first and second extendable units 20', 26' may extend from a fully retracted position, illustrated in FIG. 6, inwardly to the left of support 24' to a fully extended position, illustrated in FIG. 7, fully outwardly to the right of support 24'. Extendable conveyor 15' includes a conveying surface 28', which is made up of an endless, flexible, friction belt 94 that is driven by a belt drive 96. Belt 94 is reeved around rollers 98 positioned at appropriate locations on first and second extendable units 20', 26' and on stationary support 24'. As is well known in the art, by suitable placement of rollers 98, belt 94 may be kept in proper tension irrespective of the extended position of extendable conveyor 15' without the necessity for lengthy belt take-ups.

Figure 7:
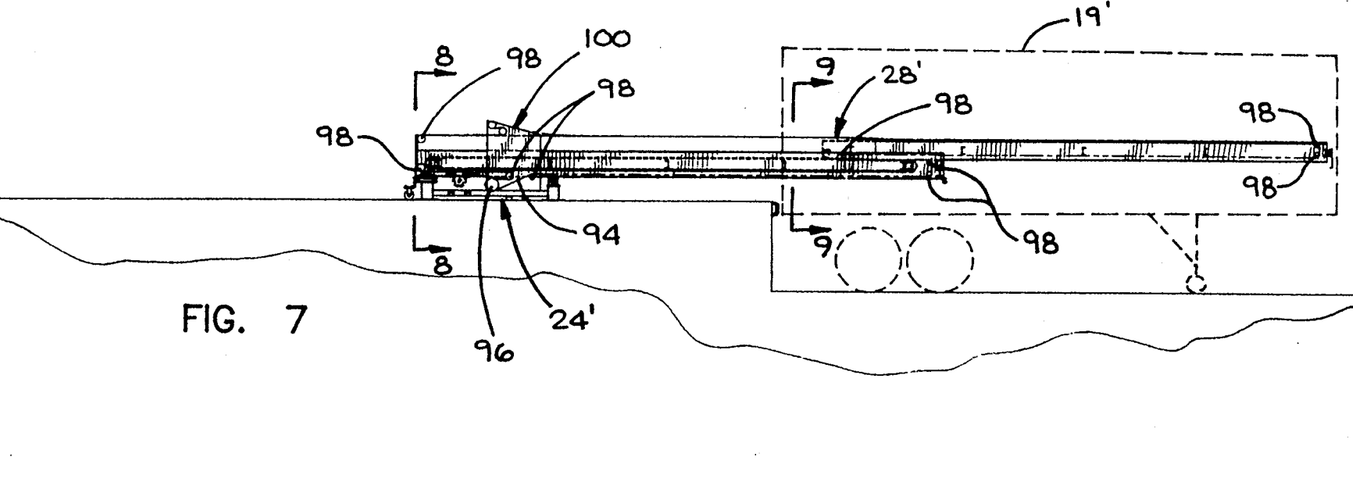
FIG. 7 is the same view as FIG. 6 of the extendable conveyor in a fully extended position.
Figure 8:
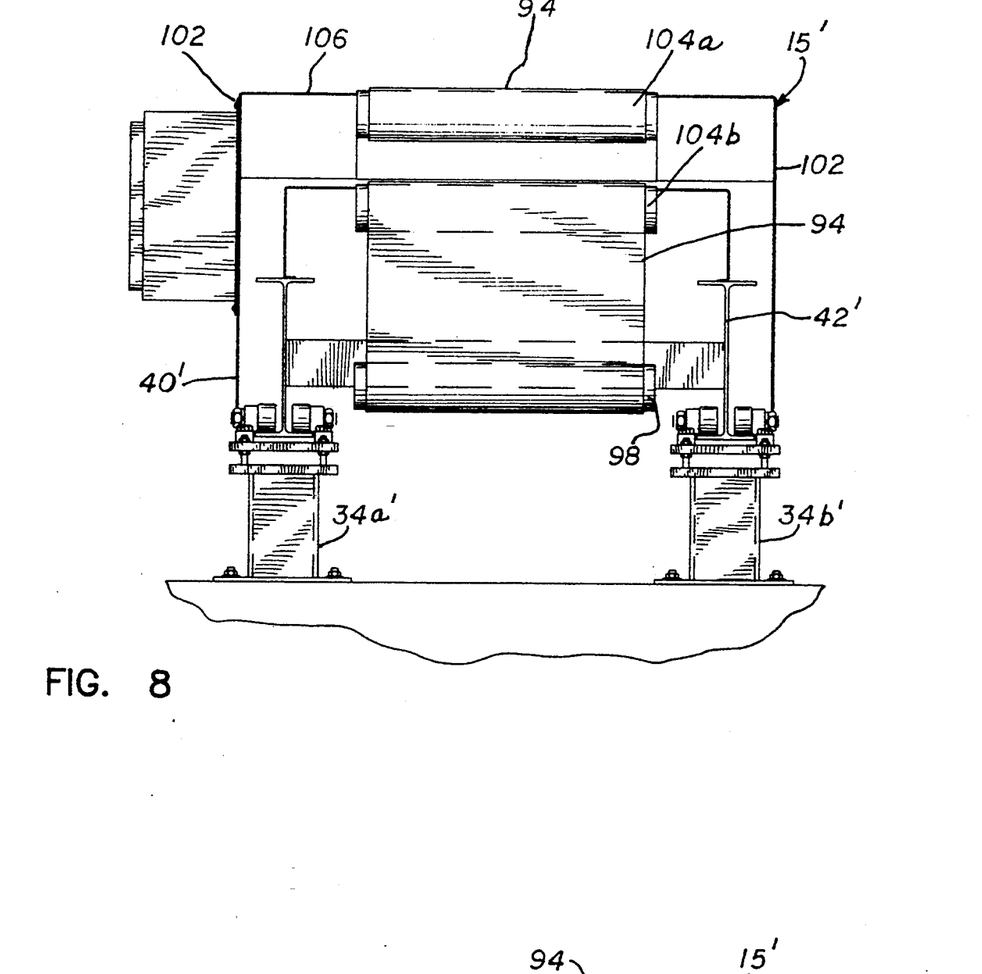
FIG. 8 is an end view taken generally from the direction 8—8 in FIG. 7.
Figure 9:
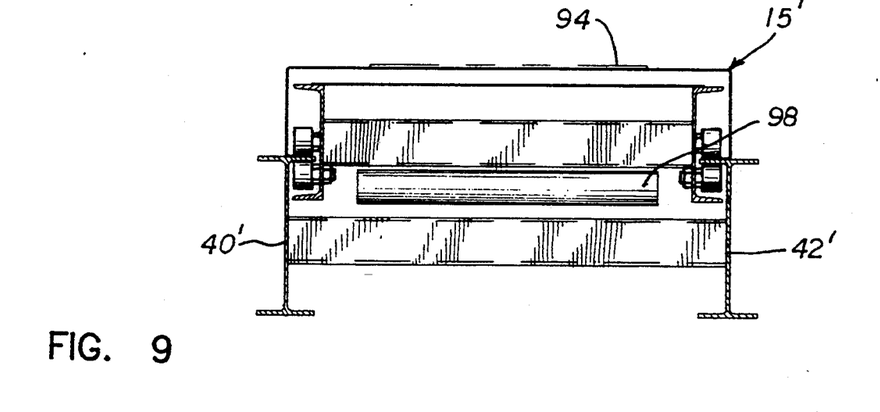
FIG. 9 is a sectional view taken along the lines 9—9 in FIG. 7.

In order to position packages discharged from trailer 19' onto a receiving conveyor (not shown), a hitch or tripper 100 is provided. Hitch 100 includes side members 102, which support a pair of offset rollers 104a and 104b and an upper sloped surface 106. Side members 102 may additionally provide support for belt drive 96 and the rollers 98 associated with support 24'. Drive belt 94 extends up sloping surface 106 and down via rollers 104a and 104b in order to elevate product being returned on conveying surface 28' to an elevated position irrespective of the extended position of extendable units 20', 26'.

Figure 10:
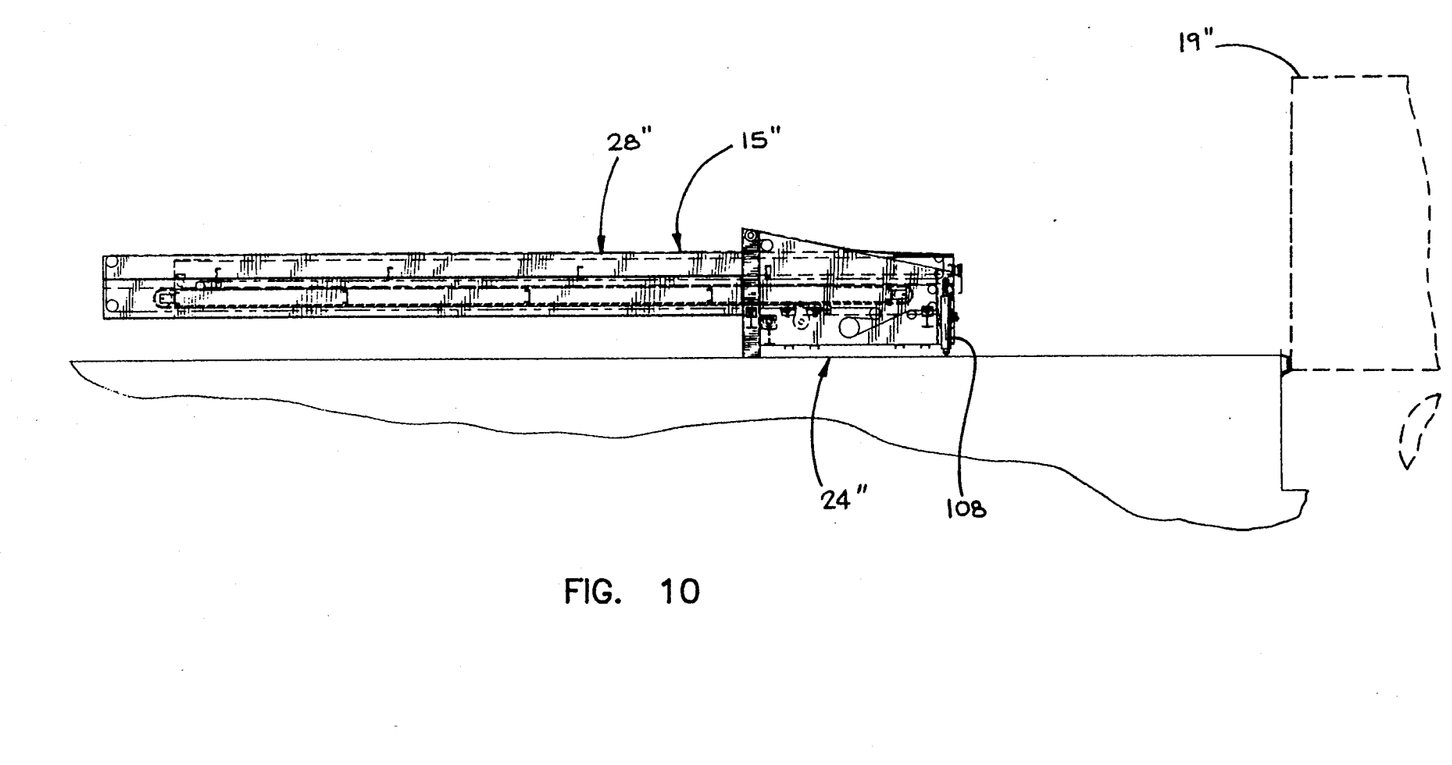
FIG. 10 is a side elevation of a third embodiment of an extendable conveyor according to the invention.

An extendable conveying 15" is illustrated in FIG. 10 in which stationary support 24" includes a pair of forward vertical supports 108 (only one of which is shown) that are vertically extendable. By making forward supports 108 vertically extendable, the slope of conveying surface 28" may be adjusted with respect to trailer 19". Although illustrated with a belt conveyor, vertically adjustable forward supports 108 may be provided with a roller conveying surface to provide a gravity fed conveyor.

Figure 11:
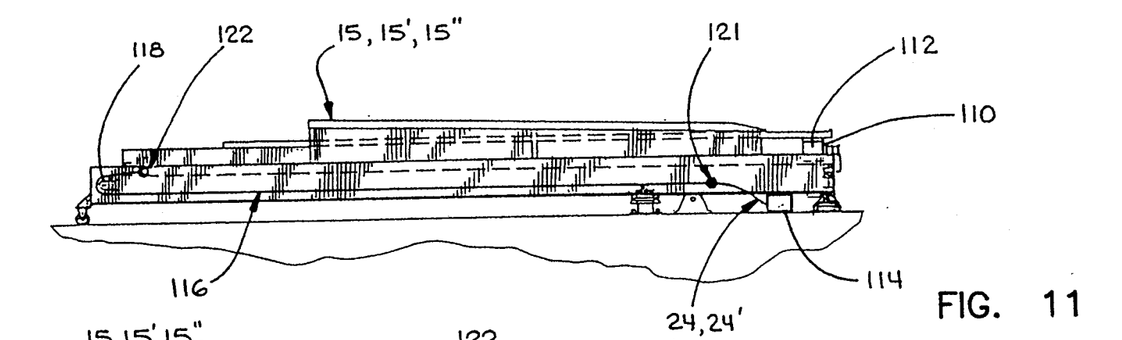
FIG. 11 is a side elevation of an electrical cable system according to the invention.
Figure 12:
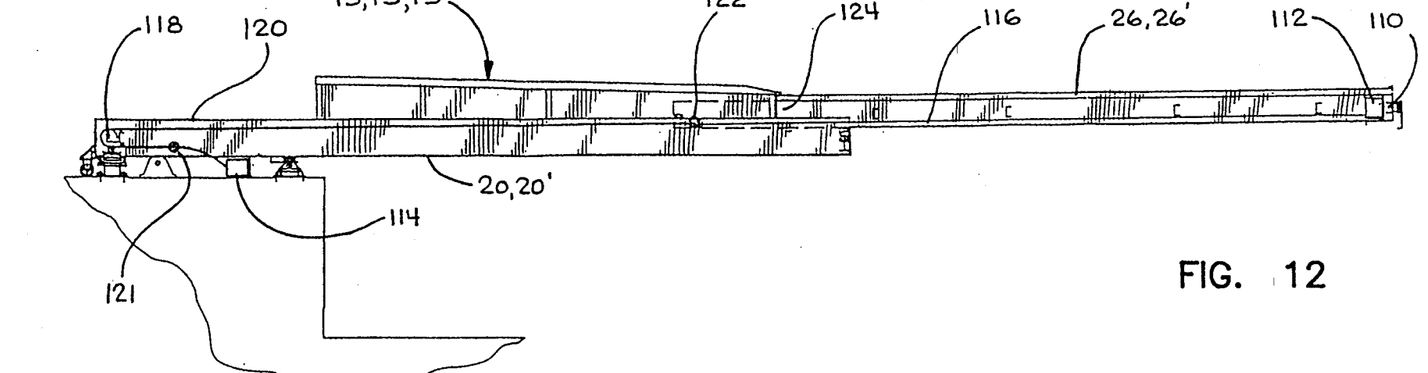
FIG. 12 is the same view as FIG. 11 with the extendable conveyor in a fully extended position.

Extendable conveyors 15, 15' and 15" may include a control package 110 at the outward-most portion of the extended conveyor. Control package 110 may include switches to allow the operator to control the extended and retracted position of the conveyor, safety bars in order to terminate extension of the conveyor upon contacting a stationary surface, lights to illuminate the loading area, as well as a myriad of possible data control elements such as bar code scanners and the like. Control element 110 is connected with a terminal panel or box 112 which, in turn, is connected with a stationary terminal panel 114 through a control cable 116 (FIGS. 11 and 12). Control cable 116 is routed from stationary terminal panel 114 over a sheave 118 mounted to inward end 120 of first extendable unit 20, 20'. Control cable 116 is supported at 121 to a stationary member, such as support 24, 24", and at 122 to an inward end 124 of second extendable unit 26, 26'. From support 122, control cable 116 extends to terminal panel 112. As set forth in detail above, second extendable unit 26, 26' is extended outwardly at a rate that is double the rate that first extendable unit 20, 20' is extended. In this manner, tension is maintained on control cable 116 between support points 121 and 122 at all extended and retracted positions of extendable conveyor 15, 15' and 15". This is advantageous because multiple sheaves 118 may be mounted on the same shaft in order to support more than one control cable extending to control package 110. Thus, control cable 116 may be utilized for high-voltage electrical power, another for low-voltage control signals and another for digital data communication.

Figure 13:
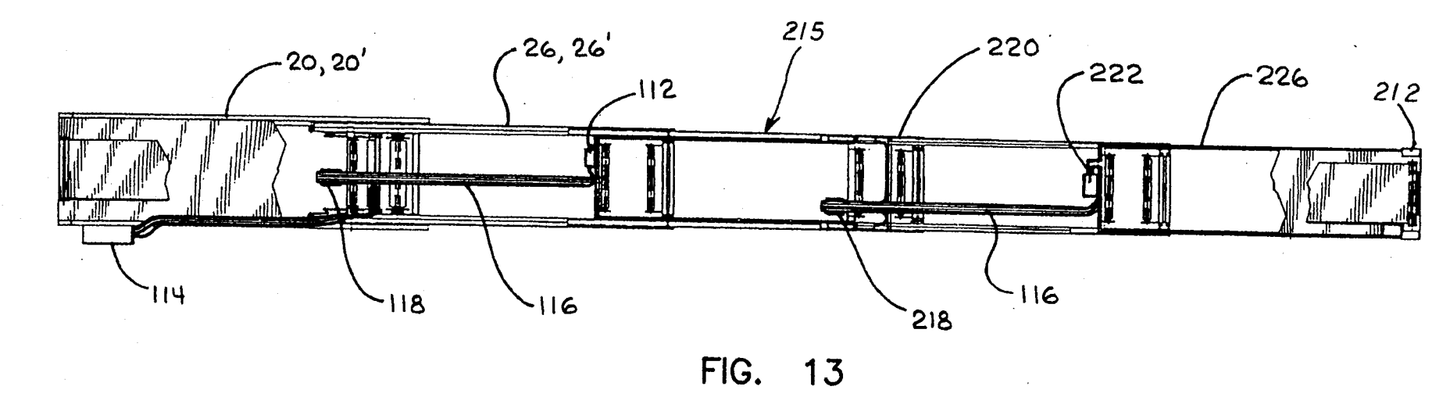
FIG. 13 is a bottom plan view of an alternative embodiment of an electrical cable system according to the invention.
Figure 14:
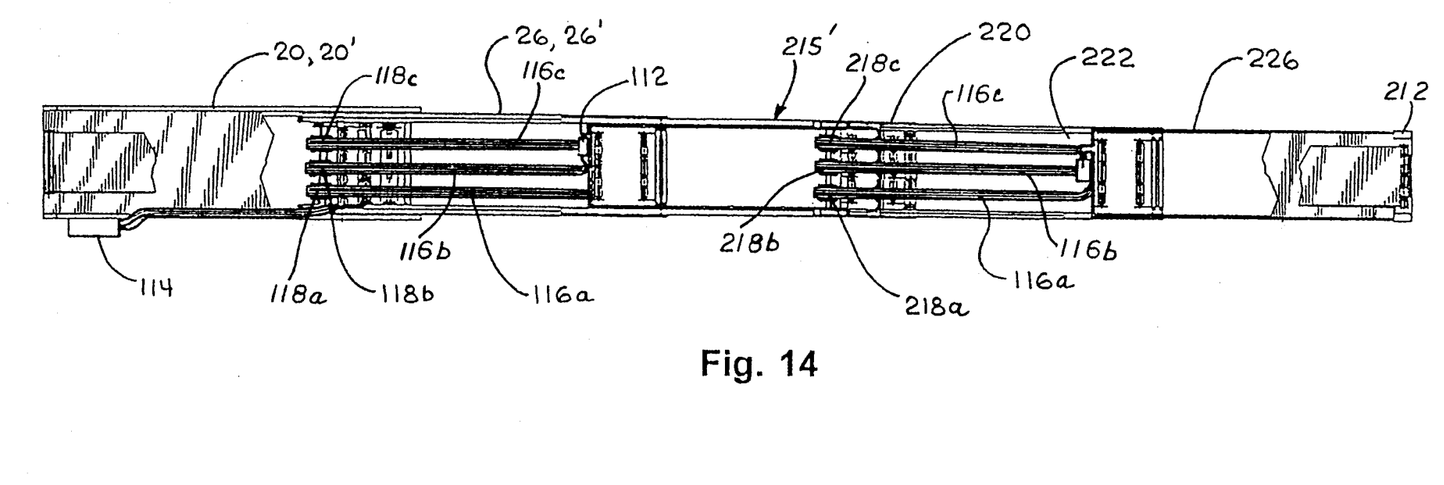
FIG. 14 is the same view as FIG. 13 of a second alternative embodiment of an electrical cable system according to the invention.

Additionally, the cable routing technique illustrated in FIGS. 11 and 12 may be applied to four-unit and six-unit extendable conveyors, as illustrated in FIG. 13. For a four-unit extendable conveyor 215, control cable 116 is routed from terminal panel 114 around sheave 118 on first extendable unit 20, 20' to terminal panel 112 on second extendable unit 26, 26'. From terminal panel 112, cable 116 extends around a sheave 218 at the same position on a third extendable unit 220 as sheave 118 is on the first extendable unit. Cable 116 then extends to a support 222 on the fourth extendable unit 226 and is routed to a terminal panel 212 on the outermost end thereof. Thus, a control cable routing according to the invention may be applied to any extendable conveyor in multiples of two extendable units. Fourth extendable unit 226 will be extended at double the rate that the third extendable unit 220 is extended, which, in turn, is extended at double the rate second extendable unit 26, 26' is extended. Such an extension system is disclosed in Brooks, Jr. U.S. Pat. No. 3,835,980, the disclosure of which is incorporated herein by reference. Under all circumstances, the necessity for costly and unreliable cable reels is avoided. An alternative four-unit extendable conveyor 215' includes three electrical cables 116a, 116b, and 116c routed from terminal panel 114 around respective sheaves 118a, 118b, and 118c on first extendable unit 20, 20' to terminal panel 112 on second extendable unit 26, 26'. From terminal panel 112, cables 116a, 116b, and 116c extend around respective sheaves 218a, 218b, and 218c on third extendable unit 220 to a support 222 on the fourth extendable unit 226. The electrical cables 116a, 116b, and 116c may be separately used for carrying, for example, high voltage electrical power, low-voltage electrical signals, digital data communication, and the like.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An extendable conveyor having at least first and second extendable units, a support system for extendably supporting the first extendable unit from a base member and for extendably supporting the second extendable unit from the first extendable unit, an extension drive mechanism for extending the first extendable unit from the base member and the second extendable unit from the first extendable unit, a plurality of electrical cables, each said cable having a portion running between said base member and said second extendable unit, said electrical cable portion routed over a separate sheave mounted to said first extendable unit and said extension drive mechanism extending said second extendable unit at a rate that is twice the rate the drive mechanism extends the first extendable unit whereby the electrical cable portion is tensioned for all positions of said extendable units.

2. The extendable conveyor in claim 1 wherein each of said electrical cables carries one of electrical power, low-voltage control signals and digital data.

3. The extendable conveyor in claim 1 wherein each said separate sheave is coaxially mounted with the other sheaves.

4. The extendable conveyor in claim 1 wherein said electrical cable is self supporting between said base member and said sheave and between said sheave and said second extendable unit.

5. An extendable conveyor having first, second, third and fourth extendable units, a support system extendably supporting the first extendable unit from a base member, extendably supporting the second extendable unit from the first extendable unit, extendably supporting the third extendable unit from the second extendable unit and extendably supporting the fourth extendable unit from the third extendable unit, an extension drive mechanism extending the first extendable unit from the base member, the second extendable unit from the first extendable unit, the third extendable unit from the second extendable unit and the fourth extendable unit from the third extendable unit, an electrical cable having a portion running between said base member and said second extendable unit, said electrical cable portion routed over a sheave mounted to said first extendable unit, said electrical cable having another electrical cable portion running between said second extendable unit and said fourth extendable unit, said another electrical cable portion routed over another sheave mounted to said third extendable unit, and said extension drive mechanism extending said second extendable unit at a rate that is twice the rate the drive mechanism extends the first extendable unit, extending said third extendable unit a rate that is twice the rate the drive mechanism extends the second extendable unit and extending said fourth extendable unit at a rate that is twice the rate the drive mechanism extends the third extendable unit, whereby said electrical cable portions are tensioned for all positions of said extendable units.

6. The extendable conveyor in claim 5 including multiple electrical cables, each extending over a separate sheave mounted to said first extendable unit and a separate another sheave mounted to said third extendable unit.

7. The extendable conveyor in claim 6 wherein each said separate sheave is coaxially mounted with the rest of the sheaves and each said separate another sheave is coaxially mounted with the rest of the another sheaves.

8. The extendable conveyor in claim 5 wherein said electrical cable is self supporting between said base member and said sheave, between said sheave and said second extendable unit, between said second extendable unit and said another sheave and between said another sheave and said fourth extendable unit.

9. An extendable conveyor having at least first, second, third and fourth extendable units, a support system for extendably supporting the first extendable unit from a base member, the second extendable unit from the first extendable unit, the third extendable unit from the second extendable unit and the fourth extendable unit from the third extendable unit; an electrical cable running between said base member and said second extendable unit over a first sheave mounted to said first extendable unit and between said second extendable unit and said fourth extendable unit over a second sheave mounted to said third extendable unit; and an extension drive mechanism to extend said extendable units at a rate that will keep said cable tensioned for all extended positions of said extendable units.

10. The extendable conveyor in claim 9 including multiple electrical cables, each extending over a separate first sheave mounted to said first extendable unit and a separate second sheave mounted to said third extendable unit.

11. The extendable conveyor in claim 10 wherein each said separate first sheave is coaxially mounted with the rest of the first sheaves and each said separate second sheave is coaxially mounted with the rest of the second sheaves.

12. The extendable conveyor in claim 9 wherein said electrical cable is self supporting between said base member and said first sheave, between said first sheave and said second extendable unit, between said second extendable unit and said second sheave and between said second sheave and said fourth extendable unit.

13. The extendable conveyor in claim 10 wherein one of said cables carries electrical power and another of said cables carries low voltage signals.

14. An extendable conveyor having at least first and second extendable units, a support system for extendably supporting the first extendable unit from a base member and the second extendable unit from the first extendable unit, an electrical cable running between said base member and said second extendable unit over a sheave mounted to said first extendable unit, and an extension drive mechanism to extend said extendable units at a rate that will keep said cable tensioned for all extended positions of said extendable units, wherein said electrical cable is substantially self-supported between said base member and said sheave and between said sheave and said second extendable unit.

15. The extendable conveyor in claim 14 including multiple electrical cables, each extending over a separate sheave mounted to said first extendable unit.

16. The extendable conveyor in claim 15 wherein each said separate sheaves are coaxially mounted.

17. The extendable conveyor in claim 15 wherein one of said cables carries electrical power and another of said cables carries low voltage signals.

18. An extendable conveyor having at least first and second extendable units, a support system for extendably supporting the first extendable unit from a base member and the second extendable unit from the first extendable unit, an electrical cable running between said base member and said second extendable unit over a sheave mounted to said first extendable unit in a manner that said cable is tensioned over said sheave, and an extension drive mechanism to extend said extendable units at a rate that will keep said cable tension for all extended positions of said extendable units.

19. The extendable conveyor in claim 18 including multiple electrical cables, each extending over a separate sheave mounted to said first extendable unit in a manner that each cable is tensioned over its sheave.

20. The extendable conveyor in claim 19 wherein each said separate sheaves are coaxially mounted.

21. The extendable conveyor in claim 19 wherein one of said cables carries electrical power and another of said cables carries low voltage signals.

* * * * *